United States Patent
Kim et al.

(10) Patent No.: US 9,883,151 B2
(45) Date of Patent: Jan. 30, 2018

(54) APPARATUS AND METHOD FOR CAPTURING LIGHTFIELD IMAGE

(71) Applicant: ELECTRONICS AND TELECOMMUNICATIONS RESEARCH INSTITUTE, Daejeon (KR)

(72) Inventors: Do-Hyung Kim, Jeungpyeong-gun (KR); Seong-Jin Park, Daejeon (KR); Il-Kyu Park, Daejeon (KR); Chang-Joon Park, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 19 days.

(21) Appl. No.: 14/952,992

(22) Filed: Nov. 26, 2015

(65) Prior Publication Data

US 2016/0156834 A1    Jun. 2, 2016

(30) Foreign Application Priority Data

Nov. 28, 2014 (KR) .................. 10-2014-0168151
Nov. 17, 2015 (KR) .................. 10-2015-0161230

(51) Int. Cl.
| | |
|---|---|
| G02B 13/16 | (2006.01) |
| H04N 5/225 | (2006.01) |
| H04N 9/04 | (2006.01) |
| H04N 5/232 | (2006.01) |
| G03B 35/10 | (2006.01) |

(52) U.S. Cl.
CPC ............. *H04N 9/045* (2013.01); *G03B 35/10* (2013.01); *H04N 5/2254* (2013.01); *H04N 5/23229* (2013.01)

(58) Field of Classification Search
CPC .. H04N 9/045; H04N 5/2254; H04N 5/23229; G03B 35/10
USPC .................. 348/335, 340, 345, 348, 350
See application file for complete search history.

(56) References Cited

U.S. PATENT DOCUMENTS

| | | | |
|---|---|---|---|
| 2005/0206737 A1 | 9/2005 | Gim et al. | |
| 2007/0120438 A1* | 5/2007 | Divoux | H02K 99/00 310/309 |
| 2010/0194926 A1 | 8/2010 | Kang et al. | |
| 2012/0050533 A1* | 3/2012 | Dewa | G02B 26/0833 348/143 |
| 2014/0078259 A1 | 3/2014 | Hiramoto et al. | |

(Continued)

FOREIGN PATENT DOCUMENTS

KR    10-2010-0088326 A    8/2010

*Primary Examiner* — Yogesh Aggarwal
(74) *Attorney, Agent, or Firm* — LRK Patent Law Firm

(57) ABSTRACT

An apparatus and method for capturing a light field image. The light field image capture apparatus includes a mirror array or a micro-lens array. An activated mirror selected from among the multiple mirrors of the mirror array provides light to the multiple elements of an image sensor. An activated lens, selected from among the multiple lenses of the micro-lens array, provides light to the multiple elements of the image sensor. Based on timesharing, the mirror, selected as the activated mirror from among the multiple mirrors, is changed, and the lens, selected as the activated lens from among the multiple lenses, is changed.

16 Claims, 6 Drawing Sheets

(56) References Cited

U.S. PATENT DOCUMENTS

2014/0204183 A1 7/2014 Lee et al.
2014/0307323 A1 10/2014 Lee et al.
2014/0354777 A1 12/2014 Lee et al.

* cited by examiner

APPARATUS AND METHOD FOR CAPTURING LIGHTFIELD IMAGE

CROSS REFERENCE TO RELATED APPLICATION

This application claims the benefit of Korean Patent Application Nos. 10-2014-0168151, filed Nov. 28, 2014, and 10-2015-0161230, filed Nov. 17, 2015 which are hereby incorporated by reference in its entirety into this application.

BACKGROUND OF THE INVENTION

1. Technical Field

The following embodiments generally relate to image processing. More particularly, an apparatus and method for capturing light field images are disclosed.

2. Description of the Related Art

Image capture apparatuses such as camera modules acquire color values that represent the image of a subject.

In order to acquire color values, an image capture apparatus includes an image sensor. The image sensor of the image capture apparatus has a width and a height, and has a predetermined resolution. The image sensor captures an image, and generates a color value for each of the coordinates of the image. Here, the coordinates indicate the position of a point on the image, and may be represented as (x, y), which is a value of 2D coordinates. Also, the color values, for example, may be an RGB value, which indicates the intensity of red, green, and blue.

Using such an image capture apparatus, a user may acquire a 2D color image. The existing image capture apparatus, which is referred to as a digital camera, generates a 2D color image as described above.

With the development of technology, a plenoptic technique is proposed. The plenoptic technique acquires both a color value for coordinates (x, y) of an image sensor and a color value for (u, v) at the said coordinates. Here, (u, v) may be information about angular resolution. In other words, the plenoptic technique acquires an (R, G, B) color value for (x, y, u, v).

According to the plenoptic technique, an array of micro-lenses is arranged between a main lens and an image sensor, and an (R, G, B) color value for (x, y, u, v) is acquired by the array of micro-lenses.

Using the plenoptic technique, information about the angle of light rays may be acquired. Based on this characteristic of the plenoptic technique, that is, because information about the angle of light rays may be acquired, the plenoptic technique is called a light field technique.

Existing image capture apparatuses such as camera modules acquire an image after focusing the apparatus on a subject. In contrast, a light field image capture apparatus using the light field technique acquires an image and may then perform optical refocusing for the acquired image. When images are acquired by existing image capture apparatuses, there may be images that are unsuitable for use or images that cannot be used because the subject is out of focus. However, the light field image capture apparatus may allow the focus to be freely readjusted. Therefore, when images are acquired by the light field image capture apparatus, there is no case in which the images cannot be used due to incorrect focusing. Also, the light field image apparatus may generate an all-in-focus image, which enables all the objects therein to be focused on.

The light field image capture apparatus also has a function of refocusing. The light field image capture apparatus records information about the directions in which light rays are travelling. Therefore, the light field image capture apparatus may generate an image from another viewpoint that is allowable with the recorded information about the light rays. Because images from various viewpoints may be generated, the light field image capture apparatus may be suitable for a multi-view stereoscopic display.

The light field image capture apparatus must partition the information space of a sensor respectively for (u, v) information, corresponding to angular resolution, and for (x, y) information, corresponding to spatial resolution. For example, when an image is captured at a high angular resolution, the spatial resolution of the image may be reduced. Conversely, when an image is captured at a high spatial resolution, the angular resolution of the image may be reduced. Therefore, when a light field image capture apparatus is designed, it is required to determine how to partition and store information about an angular resolution and information about a spatial resolution.

With regard to a light field image capture apparatus, Korean Patent Application Publication No. 10-2010-0088326 disclosed an apparatus of capturing multi-view light field data using a variable modulator.

SUMMARY OF THE INVENTION

An embodiment may provide an apparatus and method capable of increasing angular resolution or spatial resolution without increasing the total resolution of an image sensor.

An embodiment may provide an apparatus and method that generate image data using some of multiple mirrors or some of multiple lenses in a single time slot based on timesharing.

An embodiment may provide an apparatus and method in which a single mirror or a single lens provides light to multiple elements of an image sensor in a single time slot.

According to an aspect of the present invention, an apparatus for capturing a light field image, including a mirror array and an image sensor, may be provided, wherein a certain number of mirrors of multiple mirrors of the mirror array provide light to multiple elements of the image sensor.

Remaining mirrors, determined by excluding the certain number of the mirrors from the multiple mirrors, may not provide light to the image sensor.

For two adjacent mirrors among the multiple mirrors, if one of the two mirrors provides light to the multiple elements of the image sensor as one of the certain number of the mirrors, a remaining one of the two mirrors may not provide light to the image sensor as one of the remaining mirrors.

A rotation angle of each of the multiple mirrors may change.

Each of the multiple mirrors may operate as one of the certain number of the mirrors or as one of the remaining mirrors, according to the rotation angle.

The apparatus may further include a controller for controlling the rotation angle.

Each of the multiple mirrors may be selected as one of the certain number of the mirrors in at least one of multiple time slots based on timesharing, The apparatus may generate image data having a size that is larger than a resolution of the image sensor, by selecting a part of the multiple mirrors as the certain number of the mirrors based on timesharing and by enabling the selected mirrors to provide light to the multiple elements of the image sensor.

The apparatus may generate the image data through n time slots obtained from timesharing, and each of the multiple mirrors may provide light to the multiple elements of the image sensor in at least one of the n time slots.

The said n may be an integer that is equal to or greater than 2.

The apparatus may further include a main lens.

The certain number of the mirrors may provide light to the multiple elements of the image sensor by reflecting light that has passed through the main lens.

According to another aspect of the present invention, a method for capturing a light field image may be provided, the method including: providing, by a certain number of mirrors of multiple mirrors of a mirror array, light to multiple elements of an image sensor; and generating, by the image sensor, image data according to the light provided to the multiple elements.

According to a further aspect of the present invention, an apparatus for capturing a light field image, including a micro-lens array and an image sensor, may be provided, wherein a certain number of lenses of multiple lenses of the micro-lens array provide light to multiple elements of the image sensor.

Remaining lenses, determined by excluding the certain number of the lenses from the multiple lenses, may not provide light to the image sensor.

For two adjacent lenses among the multiple lenses, if one of the two lenses provides light to the multiple elements of the image sensor as one of the certain number of the lenses, a remaining one of the two lenses may not provide light to the image sensor, as one of the remaining lenses.

The apparatus may further include a mask that includes multiple areas and controls whether each of the multiple areas passes light.

Each of the multiple lenses may operate as one of the certain number of the lenses or as one of the remaining lenses due to the mask.

For the multiple lenses, a lens adjacent to an, area that passes light among the multiple areas may operate as one of the certain number of the lenses, and a lens adjacent to an area that does not pass light among the multiple areas may operate as one of the remaining lenses.

The apparatus may further include a controller for electronically controlling the mask.

Each of the multiple lenses may be selected as one of the certain number of the lenses in at least one of multiple time slots based on timesharing.

The apparatus may generate image data having a size that is larger than a resolution of the image sensor, by selecting a part of the multiple lenses as the certain number of the lenses and by enabling the selected lenses to provide light to the multiple elements of the image sensor.

The apparatus may generate the image data through n time slots obtained from timesharing, and each of the multiple lenses may provide light to the multiple elements of the image sensor in at least one of n time slots.

The said n may be an integer that is equal to or greater than 2.

The apparatus may further include a main lens.

The certain number of the lenses may provide light to the multiple elements of the image sensor by focusing light that has passed through the main lens on each of the multiple elements.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
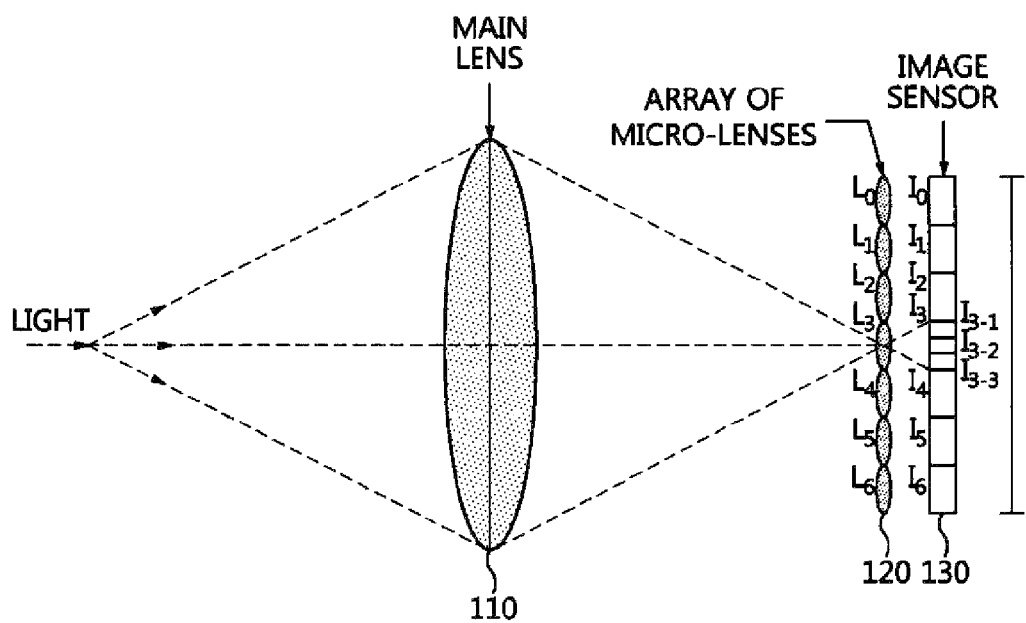
FIG. 1 illustrates the image capture method of plenoptic 1.0.

Specific embodiments will be described in detail below with reference to the attached drawings. It should be understood that the embodiments differ from each other, but the embodiments do not need to be exclusive of each other.

The terms used in the embodiments should not be construed as being limited to ordinary meanings or dictionary definitions, and may be interpreted based on practical meanings of the terms and the present specification.

It will be understood that when an element is referred to as being "connected" or "coupled" to another element, it can be directly connected or coupled to the other element, or intervening elements may be present. In the following description of the present invention, the same reference numerals are used to designate the same or similar elements throughout the drawings.

FIG. 1 illustrates the image capture method of plenoptic 1.0.

The image capture apparatus of plenoptic 1.0 may include a main lens 110, an array of micro-lenses 120, and an image sensor 130.

When light passes through the main lens 110 in the center, the focus of the light, which has passed through the main lens 110, may be on the array of micro-lenses 120. The lens $L_i$ of the array of micro-lenses 120 and the area $I_i$ of the image sensor may correspond to each other. For example, the light that has passed through the lens $L_i$ may be projected on the area of the image sensor, and the information about the light that has passed through the lens $L_i$ may be recorded on the area $I_i$ of the image sensor.

If the area $I_i$ of the image sensor has n image sensor elements, n pieces of information may be recorded for the light that has passed through the lens $L_i$. Here, n may be an integer that is equal to or greater than 1. For example, if the area $I_3$ of the image sensor has three image sensor elements, namely, $I_{3-1}$, $I_{3-2}$, and $I_{3-3}$, respective information may be recorded on the image sensor elements $I_{3-1}$, $I_{3-2}$, and $I_{3-3}$ for the light that has passed through the lens $L_3$, whereby three pieces of information may be generated.

Figure 2:
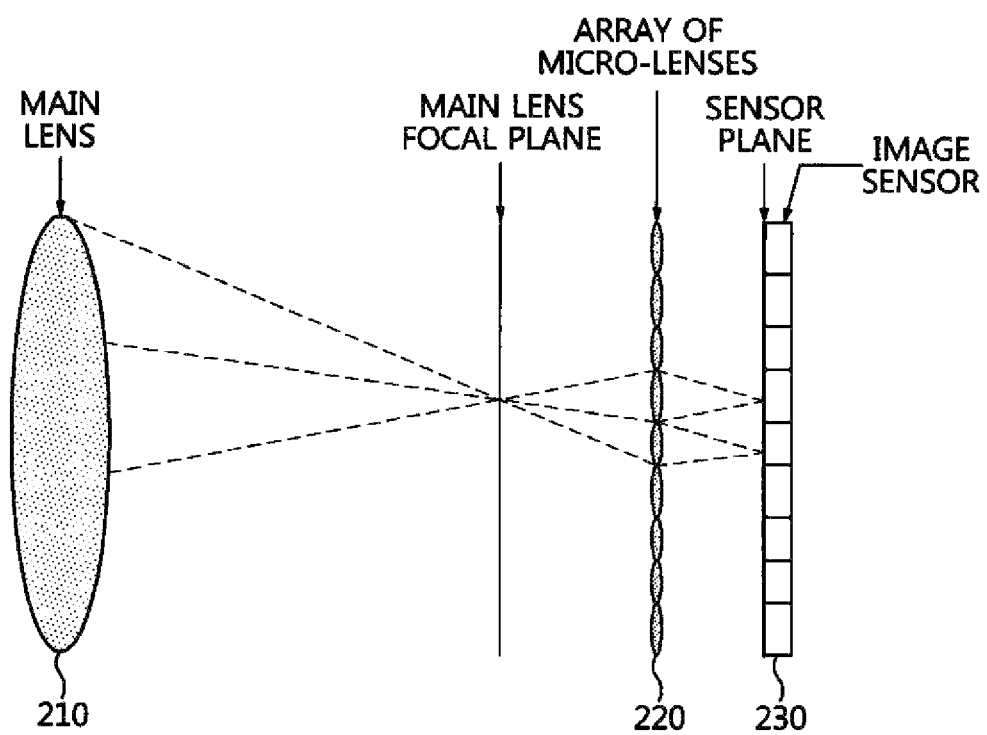
FIG. 2 illustrates the image capture method of plenoptic 2.0.

FIG. 2 illustrates the image capture method of plenoptic 2.0.

The image capture apparatus of plenoptic 2.0 may include a main lens 210, an array of micro-lenses 220, and an image sensor 230.

When light passes through the main lens 210 in the center, the focus of the light that has passed through the main lens 210 may be placed at the front of the array of micro-lenses 220. Also, the lenses of the array 220 may be focused on a focal plane.

The light that has passed through one of the array of micro-lenses 220 may be projected on the image sensor 230 on a sensor plane. Also, the light that has passed through the lens may be recorded on the area of the image sensor.

In both plenoptic 1.0 and plenoptic 2.0, an image sensor is located after an array of micro-lenses. That is, a main lens, the array of micro-lenses, and the image sensor are arranged in that, order. Also, in both plenoptic 1.0 and plenoptic 2.0, a single lens of the array of micro-lenses may correspond to a single area of the image sensor. Here, the area of the image sensor may be a unit of information to be recorded, or a unit of information to be generated.

Figure 3:
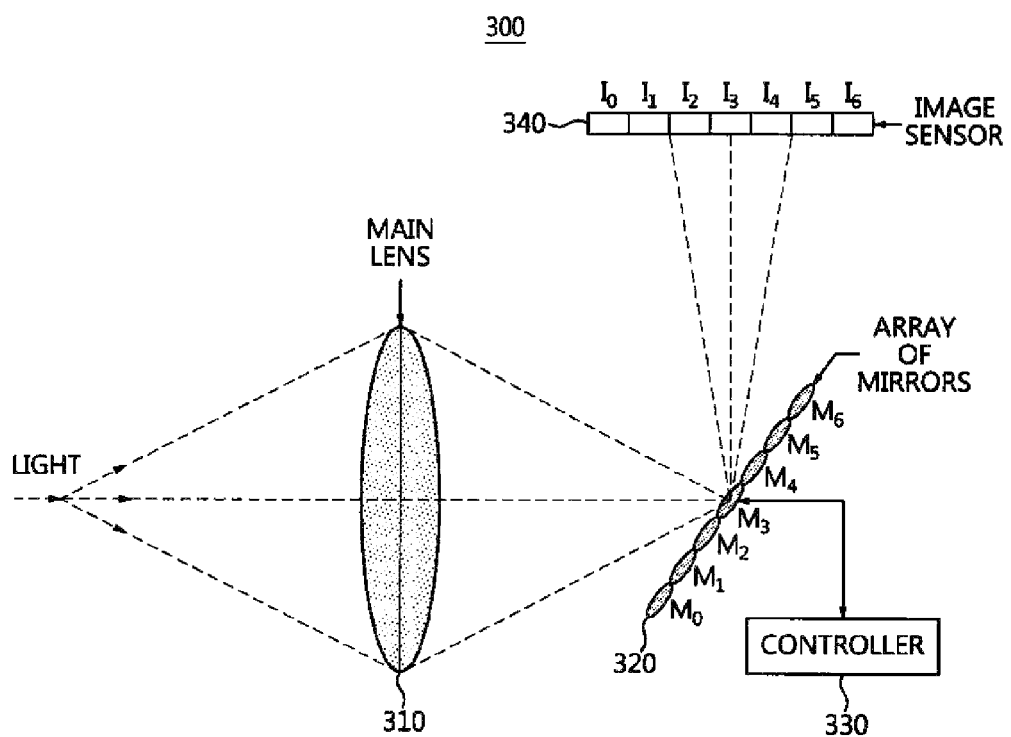
FIG. 3 illustrates a light field image capture apparatus using a mirror according to an embodiment.

FIG. 3 illustrates a light field image capture apparatus using a mirror according to an embodiment.

The light field image capture apparatus 300 may include a main lens 310, an array of mirrors 320, a controller 330, and an image sensor 340.

The mirror array 320 may include mirrors. FIG. 3 illustrates the mirrors $M_0$ to $M_6$ as an example of the mirrors of the mirror array 320. Each of the mirrors of the mirror array 320 may be a micro-mirror. For example, the mirror array 320 may, operate as in the case of an array of mirrors included in a Digital Light Processing (DLP) projector.

The multiple mirrors may be arranged in a 2D arrangement in the mirror array 320.

The image sensor 340 may include elements. FIG. 3 illustrates elements $I_0$ to $I_6$ as an example of the elements of the image sensor 340. Each of the elements of the image sensor 340 may generate information about the light projected on the element.

The light field image capture apparatus 300 may operate based on timesharing. Based on timesharing, in one time slot, some of the mirrors, selected from among the multiple mirrors of the mirror array 320, may be activated, and the remaining mirrors may be deactivated. Also, in another time slot, the activated mirrors may be deactivated, and at least some of the deactivated mirrors may be activated. In other words, the multiple mirrors of the mirror array 320 may be activated sequentially.

The activated mirror may be a mirror that provides light to the image sensor 340 or a mirror that is controlled to provide light to the image sensor 340. The deactivated mirror may be a mirror that does not provide light to the image sensor 340 or a mirror that is controlled not to provide light to the image sensor 340.

The activated mirrors, selected from among the multiple mirrors of the mirror array 320, may provide light to the image sensor 340. The activated mirrors may record information on the area of the image sensor 340 by providing light to the image sensor 340. Here, the target to which the light is provided may be multiple elements of the image sensor 340 rather than a single element thereof. Namely, the activated mirrors, selected from among the multiple mirrors of the mirror array 320, may provide light to the multiple elements of the image sensor 340 by reflecting the light that has passed through the main lens 310. The activated mirrors, selected from among the multiple mirrors of the mirror array 320, may be focused on each of the multiple elements of the image sensor 340, and may reflect the light that is focused on each of the multiple elements.

The activated mirrors may provide light to the multiple elements of the image sensor 340 by reflecting the light that has passed through the main, lens 310. Therefore, the activated mirrors may provide light to the area of the image sensor 340, which is wider than that in the existing plenoptic technique, and may record information on the wider area of the image sensor 340.

Also, the deactivated mirrors, determined by excluding the activated mirrors from the multiple mirrors of the mirror array 320, may not provide light to the image sensor 340. Namely, the deactivated mirrors, among the multiple mirrors, may not reflect the light that has passed through the main lens 310, or may reflect the light that has passed through the main lens 310 into a particular space in order to avoid affecting the image sensor 340.

Each of the multiple mirrors of the mirror array 320 may be selected as one of the activated mirrors in at least one of multiple time slots based on timesharing. For example, the multiple mirrors of the mirror array 320 may be categorized into multiple groups, and one of the multiple groups may be selected in one time slot based on timesharing. The mirrors in the selected group may be activated. Also, the mirrors in the remaining groups, resulting from exclusion of the selected group from the multiple groups, may be deactivated. Based on timesharing, the multiple groups may be selected sequentially by the controller 330.

For example, in a time slot $T_0$, the mirror $M_3$ may be selected as the activated mirror, and the mirrors $M_2$ and $M_4$ may be selected as deactivated mirrors. The activated mirror $M_3$ may record information on the multiple elements $I_2$, $I_3$, and $I_4$ of the image sensor 340. The deactivated mirrors $M_2$ and $M_4$ may not record information on any element of the image sensor 340.

Also, in the next time slot $T_1$, the mirrors $M_2$ and $M_4$ may be selected as the activated mirrors, and the mirror $M_3$ may be selected as the deactivated mirror. The mirror $M_2$ may record information on the multiple elements $I_0$, $I_1$, and $I_2$ of the image sensor 340, and $M_4$ may record information on the multiple elements $I_4$, $I_5$, and $I_6$ of the image sensor 340. The deactivated mirror $M_3$ may not record information on any element of the image sensor 340.

The light field image capture apparatus 300 selects some of the multiple mirrors of the mirror array 320 as the activated mirrors and enables the activated mirrors to provide light to the multiple elements of the image sensor 340, whereby image data having a size that is larger than the resolution of the image sensor 340 may be generated. Namely, the resolution of the image data generated by the light field image capture apparatus 300 may be larger than the resolution of the image sensor 340. Here, the resolution of the image sensor 340 may correspond to the number of elements of the image sensor 340.

The light field image capture apparatus 300 may generate image data by combining pieces of information that are acquired by the image sensor 340 in multiple time slots. For example, the light field image capture apparatus 300 may generate image data using both information acquired by the element of the image sensor 340 in a time slot $T_0$ and information acquired by the element of the image sensor 340 in a time slot $T_1$. As described above, when a single mirror that is activated in one time slot records information on the three elements, the light field image capture apparatus 300 may generate image data having a resolution that is three times the resolution of the image sensor 340. Also, according to the circumstances, the light field image capture apparatus 300 may generate image data through three time slots.

The light field image capture apparatus 300 may generate image data through n time slots. For example, the multiple mirrors of the mirror array 320 may be categorized into n groups. Each of the multiple mirrors of the mirror array 320 may provide light to the multiple elements of the image sensor 340 in at least one of n time slots. For example, each of the multiple mirrors of the mirror array 320 may be included in at least one of n groups. Here, n may be an integer that is equal to or greater than 2.

For example, for the multiple mirrors $M_0$ to $M_k$ of the mirror array 320, when the value of j % n is p, the mirror M may be included in the group p. The group p may be a group of mirrors that are activated in the (p+1)-th time slot. Here, k may be an integer that is equal to or greater than 1, j may be an integer that is equal to or greater than 0 and equal to or less than k, and p may be an integer that is equal to or greater than 0 and equal to or less than n−1. For example, in the first time slot, $M_0$, $M_n$, $M_{2n}$, $M_{3n}$, and the like, selected from among the multiple mirrors of the mirror array 320, may be activated. In the second time slot, $M_1$, $M_{n+1}$, $M_{2n+1}$, $M_{3n+1}$, and the like, selected from among the multiple mirrors of the mirror array 320, may be activated. In the (n−1)-th time slot, $M_{n-1}$, $M_{2n-1}$, $M_{3n-1}$, $M_{4n-1}$, and the like, selected from among the multiple mirrors of the mirror array 320, may be activated.

The activated mirrors, selected from among the multiple mirrors of the mirror array 320, may provide light to a plurality of adjacent elements of the image sensor 340. Here, the adjacent elements may have a one-dimensional form (i.e. the shape of a line) or a two-dimensional form (for example, the shape of a rectangle or a circle). When the activated mirrors provide light to multiple adjacent elements, if a mirror adjacent to the activated mirror also provides light to the elements, a malfunction in which multiple mirrors provide light to one element may occur. For two adjacent mirrors among the multiple mirrors of the mirror array 320, if one of the two mirrors, as an activated mirror, provides light to the multiple elements of the image sensor, the other mirror, as a deactivated mirror, may not provide light to the image sensor 340.

Whether to activate each of the multiple mirrors of the mirror array 320 may be determined by a rotation angle. For example, when the rotation angle of a mirror corresponds to a predetermined value or a value that falls within a predetermined range, the mirror may be activated to provide light to the multiple elements of the image, sensor 340. If the rotation angle of a mirror does not correspond to the predetermined value or a value within the predetermined range, the mirror may be deactivated so as not to provide light to the image sensor 340.

The rotation angle of each of the multiple mirrors of the mirror array 320 may change. Each of the mirrors may operate as one of the activated mirrors or one of the deactivated mirrors depending on the rotation angle thereof. The controller 330 may control the rotation angle of each of the multiple mirrors of the mirror array 320. Alternatively, the controller 330 may control the rotation angle of the mirror array 320, and the rotation angle of each of the multiple mirrors of the mirror array 320 may be changed according to the rotation angle of the mirror array 320, which is changed by the control.

The mirror array 320, or each of the multiple mirrors of the mirror array 320, may include an axis of rotation, and may rotate on the axis.

The controller 330 may control the mirror array 320 or each of the multiple mirrors of the mirror array 320 so that they have different rotation angles in different time slots based on timesharing.

Figure 4:
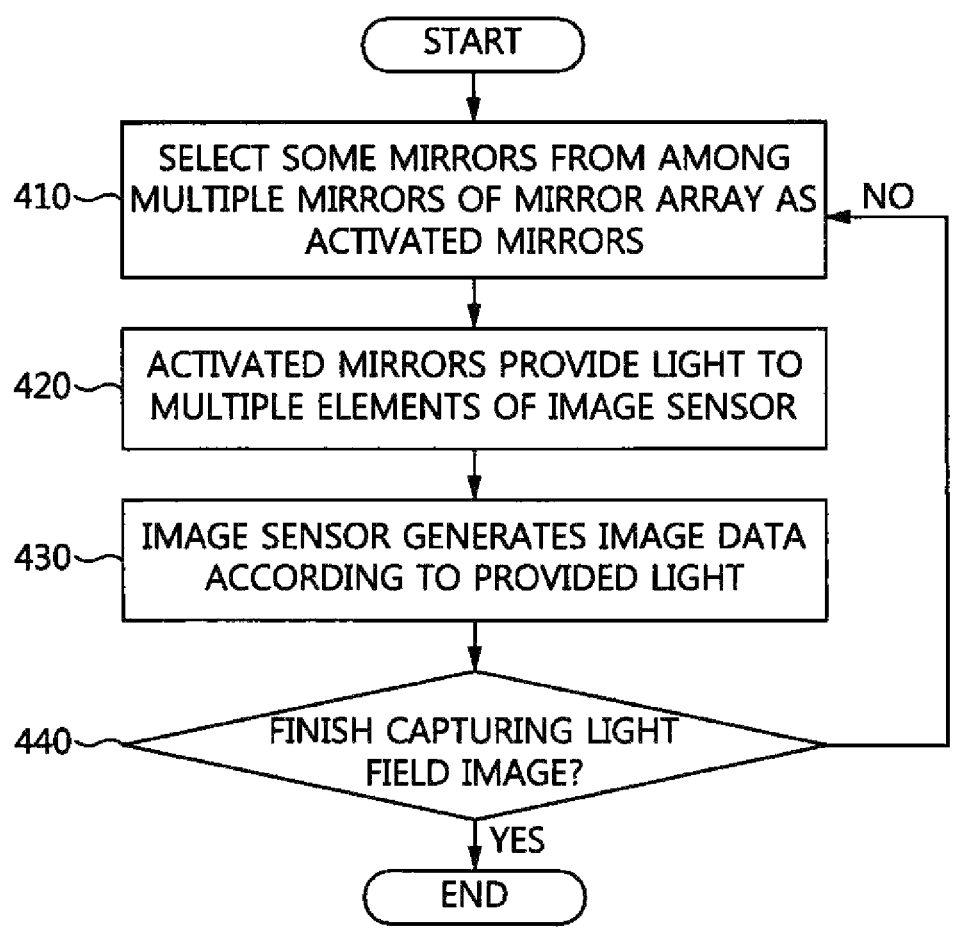
FIG. 4 is a flowchart of a light field image capture method according to an embodiment.

FIG. 4 is a flowchart of a light field image capture method according to an embodiment.

At step 410, some of the multiple mirrors of the mirror array 320 may be selected as activated mirrors. The remaining mirrors, determined by excluding the activated mirrors from the multiple mirrors of the mirror array 320, may be selected as deactivated mirrors.

At step 420, the activated mirrors, selected from among the multiple mirrors of the mirror array 320, may provide light to multiple elements of the image sensor 340.

Also, the deactivated mirrors, determined by excluding the activated mirrors from the multiple mirrors of the mirror array 320, may not provide light to the image sensor 340.

At step 430, the image sensor 340 may generate image data according to the light provided to the multiple elements.

When light is provided to an element of the image sensor 340, the element may generate data corresponding to the provided light.

At step 440, the controller 330 may determine whether to finish capturing the light field image. When the controller 330 determines not to finish capturing the light field image, step 410 may be performed again. When the controller 330 determines to finish capturing the light field image, the process may be terminated.

When step 410 is performed again, a mirror other than the currently activated mirror may be selected as an activated mirror.

For example, in the case where there are n time slots, steps 410, 420, and 430 may be repeated n times. For the multiple mirrors Mo to Mk of the mirror array 320, when the value of j % n is p, the mirror $M_j$ may be included in the group p. The group p may be a group of mirrors that are activated in the (p+1)-th time slot, among the repeated n time slots. Here, k may be an integer that is equal to or greater than 1, j may be an integer that is equal to or greater than 0 and equal to or less than k, and p may be an integer that is equal to or greater than 0 and equal to or less than n−1.

When step 410 is performed for the first time, $M_0$, $M_n$, $M_{2n}$, $M_{3n}$, and the like, selected from among the multiple mirrors of the mirror array 320, may be activated. When step 410 is performed for the second time, $M_1$, $M_{n+1}$, $M_{2n+1}$, $M_{3n+1}$, and the like, selected from among the multiple mirrors of the mirror array 320, may be activated. When step 410 is performed for the (n−1)-th time, $M_{n-1}$, $M_{2n-1}$, $M_{3n-1}$, $M_{4n-1}$, and the like, selected from among, the multiple mirrors of the mirror array 320, may be activated.

Figure 5:
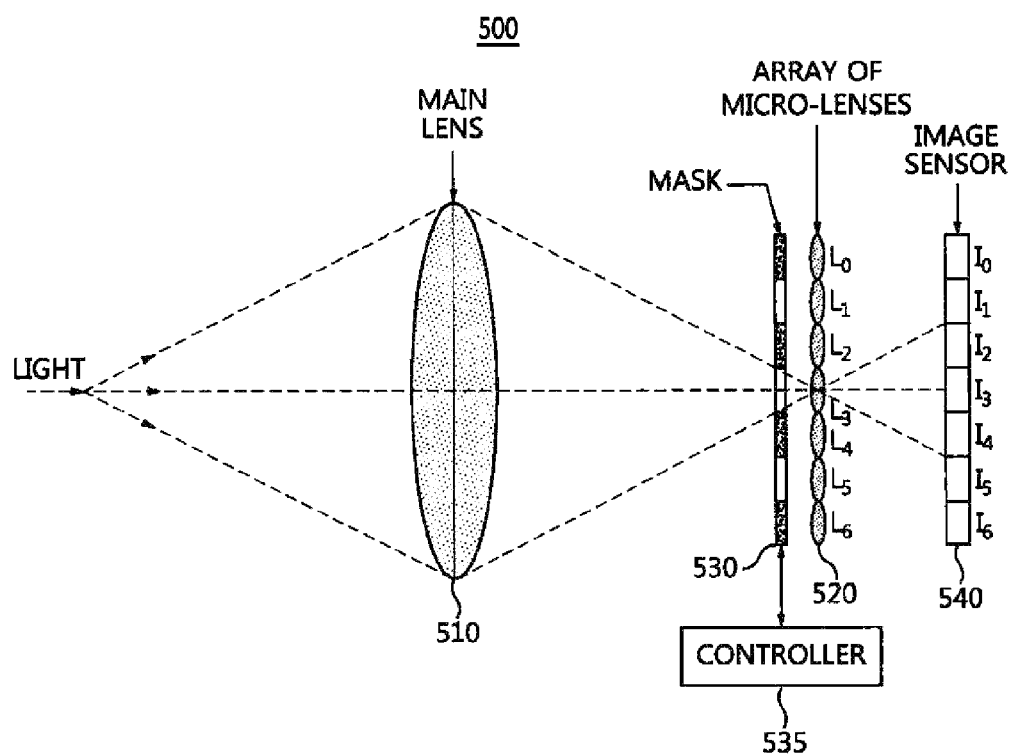
FIG. 5 illustrates a light field image capture apparatus using a lens according to an embodiment.

FIG. 5 illustrates a light field image capture apparatus using a lens according to an embodiment.

The light field image capture apparatus 500 may include a main lens 510, a micro-lens array 520, a mask 530, a controller 535, and an image sensor 540.

The micro-lens array 520 may include lenses. FIG. 5 illustrates lenses $L_0$ to $L_6$ as an example of the lenses of the micro-lens array 520. Each of the lenses of the micro-lens array 520 may be a micro-lens.

The multiple lenses may be arranged in a 2D arrangement in the micro-lens array 520.

The image sensor 540 may include elements. FIG. 5 illustrates elements $I_0$ to $I_6$ as an example of the elements of the image sensor 540. Each of the elements of the image sensor 540 may generate information, about light projected on the element.

The light field image capture apparatus 500 may operate based on timesharing. Based on timesharing, in one time slot, some of the multiple lenses of the micro-lens array 520 may be activated and the remaining lenses may be deactivated. Also, in another time slot, the activated lenses may be deactivated, and at least some of the deactivated lenses may be activated. That is, over time, the multiple lenses of the micro-lens array 520 may be activated sequentially.

The activated lens may be a lens that provides light to the image sensor 540 or a lens that is controlled so as to provide light to the image sensor 540. The deactivated lens may be a lens that does not provide light to the image sensor 540 or a lens that is controlled so as not to provide, light to the image sensor 540.

The activated lenses, selected from among the multiple lenses of the micro-lens array 520, may provide light to the image sensor 540. The activated lenses may record information on the area of the image sensor 540 by providing light to the image sensor 540. Here, the target to which the light is provided may be multiple elements of the image sensor 540 rather than a single element thereof. In other words, the activated lenses, selected from among the multiple lenses of the micro-lens array 520, may provide light to the multiple elements of the image sensor 540 by focusing light that has passed through the main lens 510 on the multiple elements of the image sensor 540. The activated lenses, selected from among the multiple lenses of the micro-lens array 520, may be focused on each of the multiple elements of the image sensor 540, and may project light that is focused on each of the multiple elements.

The activated lenses, selected from among the multiple lenses of the micro-lens array 520, may provide light to the multiple elements of the image sensor 540 by focusing the light that has passed through the main lens 510 on the multiple elements of the image sensor 540. Therefore, the activated lenses may provide light to the area of the image sensor 540 that is wider than that in the existing plenoptic function, and may record information on the wider area of the image sensor 540.

Also, the deactivated lenses, determined by excluding the activated lenses from the multiple lenses of the micro-lens array 520, may not provide light to the image sensor 540. Namely, the deactivated lenses, among the multiple lenses, may not project the light that has passed through the main lens 510. Alternatively, the deactivated lenses may focus the light that has passed through the main lens 510 on a particular space in order to avoid affecting the image sensor 540.

Each of the multiple lenses of the micro-lens array 520 may be selected as one of the activated lenses in, at least one of multiple time slots based on timesharing. For example, the multiple lenses of the micro-lens array 520 may be categorized into multiple groups, and one of the multiple groups may be selected in one time slot based on timesharing. The lenses in the selected group may be activated. Also, the lenses in the remaining groups, determined by excluding the selected group from the multiple groups, may be deactivated. Based on timesharing, the multiple groups may be selected sequentially by the controller 535.

For example, in a time slot $T_0$, the lens $L_3$ may be selected as the activated lens, and the lenses $L_2$ and $L_4$ may be selected as the deactivated lenses. The activated lens $L_3$ may record information on the multiple elements $I_2$, $I_3$, and $I_4$ of the image sensor 540. The deactivated lenses $L_2$ and $L_4$ may not record information on any element of the image sensor 540.

Also, in the next time slot $T_1$, the lenses $L_2$ and $L_4$ may be selected as the activated lenses, and the lens $L_3$ may be selected as the deactivated lens. The lens $L_2$ may record information on the multiple elements $I_0$, $I_1$, and $I_2$ of the image sensor 540, and $L_4$ may record information on the multiple elements $I_4$, $I_5$, and $I_6$ of the image sensor 540. The deactivated lens $L_3$ may not record information on any element of the image sensor 540.

The light field image capture apparatus 500 selects some of the multiple lenses of the micro-lens array 520 as the activated lenses and enables the activated lenses to provide light to the multiple elements of the image sensor 540, whereby image data having a size that is larger than the resolution of the image sensor 540 may be generated. That is, the resolution of the image data generated by the light field image capture apparatus 500 may be larger than the resolution of the image sensor 540. Here, the resolution of the image sensor 540 may correspond to the number of elements of the image sensor 540.

The light field image capture apparatus 500 may generate image data by combining pieces of information that are acquired by the image sensor 540 in multiple time slots. For example, the light field image capture apparatus 500 may generate image data using both information acquired by the element of the image sensor 540 in a time slot $T_0$ and information acquired by the element of the image sensor 540 in a time slot $T_1$. As described above, when a single lens that is activated in, one time slot records information on the three elements, the light field image capture apparatus 500 may generate image data having a resolution that is three times the resolution of the image sensor 540. Also, according to the circumstances, the light field image, capture apparatus 500 may generate image data through three time slots.

The light field image capture apparatus 500 may generate image data through n time slots. For example, the multiple lenses of the micro-lens array 520 may be categorized into n groups. Each of the multiple lenses of the micro-lens array 520 may provide light to the multiple elements of the image sensor 540 in at least one of n time slots. For example, each of the multiple lenses of the micro-lens array 520 may be included in at least one of n groups. Here, n may be an integer that is equal to or greater than 2, For example, for the multiple lenses $L_0$ to $L_k$ of the micro-lens array 520, when the value of j % n is p, the lens $L_j$ may be included in the group p. The group p may be a group of lenses that are activated in the (p+1)-th time slot. Here, k may be an integer that is equal to or greater than 1, j may be an integer that is equal to or greater than 0 and equal to or less than k, and p may be an integer that is equal to or greater than 0 and equal to or less than n−1. For example, in the first time slot, $L_0$, $L_n$, $L_{2n}$, $L_{3n}$, and the like, selected from among the multiple lenses of the micro-lens array 520, may be activated. In the second time slot, $L_1$, $L_{n+1}$, $L_{2n+1}$, $L_{3n+1}$, and the like, selected from among the multiple lenses of the micro-lens array 520, may be activated. In the (n−1)-th time slot, $L_{n-1}$, $L_{2n-1}$, $L_{3n-1}$, $L_{4n-1}$, and the like, selected from among the multiple lenses of the micro-lens array 520, may be activated.

The activated lenses, selected from among the multiple lenses of the micro-lens array 520, may provide light to a plurality of adjacent elements of the image sensor 540. Here, the multiple adjacent elements may have a one-dimensional form (for example, the shape of a line) or a two-dimensional form (for example, the shape of a rectangle or a circle). When the activated lenses provide light to the multiple adjacent elements, if a lens adjacent to the activated lens also provides light to the elements, a malfunction in which multiple lenses provide light to one element may occur. For two adjacent lenses among the multiple lenses of the micro-lens array 520, if one of the two lenses, as an activated lens, provides light to the multiple elements of the image sensor, the other lens, as a deactivated lens, may not provide light to the image sensor 540.

In order to select activated lenses and deactivated lenses, the mask 530 may be used. The controller 535 may electronically control the mask 530. Namely, the mask 530 may be an electronic mask.

The mask 530 may include multiple areas. The mask 530 may control whether or not each of the multiple areas of the mask 530 passes light.

The multiple areas of the mask 530 may correspond to the multiple lenses of the micro-lens array 520. Among the multiple areas of the mask 530 and the multiple lenses of the micro-lens array 520, an area and a lens that are closest to each other, may correspond to each other. Alternatively, among the multiple areas of the mask 530, an area directly in front of a particular lens in the micro-lens array 520 may correspond to that lens.

Each of the multiple lenses of the micro-lens array 520 may operate as one of the activated lenses or one of the deactivated lenses by the mask 530. Whether to activate each of the multiple lenses of the micro-lens array 520 may be determined by the mask 530. For example, when an area of the mask 530 that corresponds to a lens of the micro-lens array 520 is configured to pass light, the lens may operate as an activated lens. When an area of the mask 530 that corresponds to a lens of the micro-lens array 520 is configured not to pass light, the lens may operate as a deactivated lens. That is, the mask 530 may operate as a barrier.

The controller 535 may control some of the multiple areas of the mask 530 to function as an activated area (that is, an area passing light), and may control the remaining areas to function as deactivated areas (that is, areas that do not pass light). Among the multiple lenses of the micro-lens array 520, a lens corresponding to the activated area may become an activated lens, and a lens corresponding to the deactivated area may become a deactivated lens. In other words, among the multiple lenses of the micro-lens array 520, a lens adjacent to an area of the mask 530 that passes light operates as one of the activated lenses, but a lens adjacent to an area of the mask 530 that does not pass light may operate as one of the deactivated lenses.

The controller 535 may control whether or not each of the multiple areas of the mask 530 passes light. The controller 535 may change the activated area of the mask 530 in different time slots based on timesharing.

Figure 6:
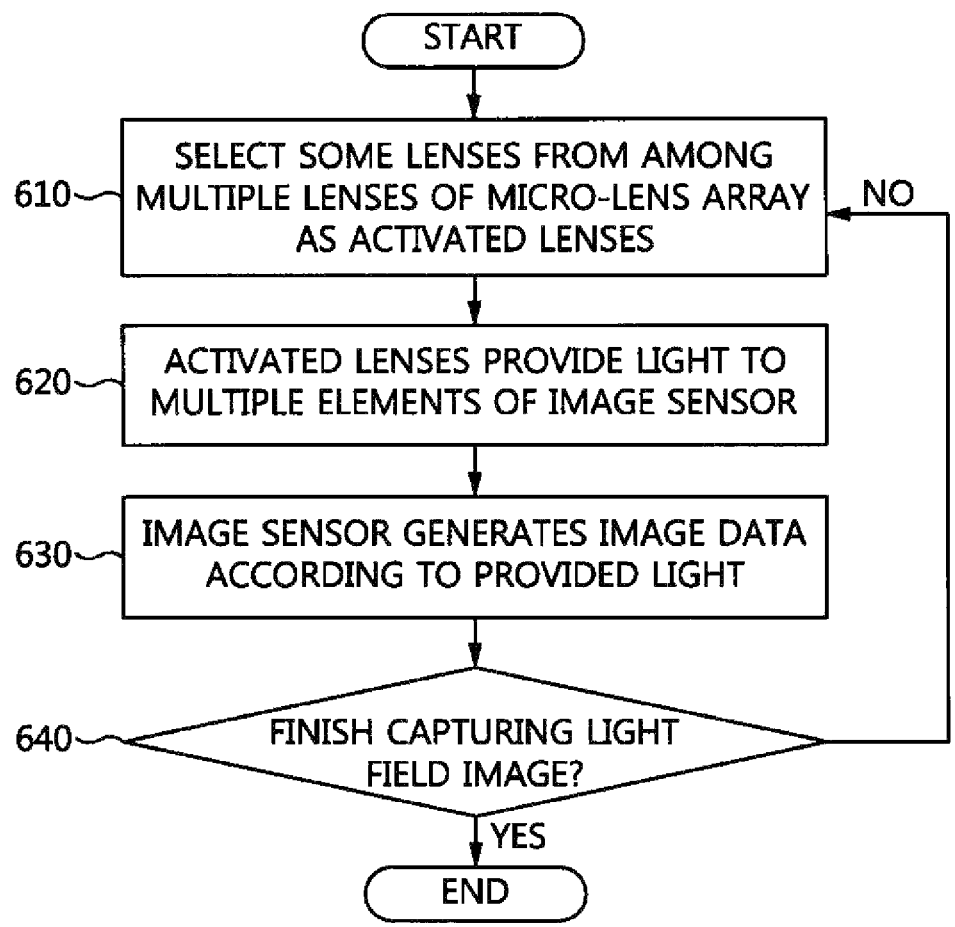
FIG. 6 is a flowchart of a light field image capture method according to an embodiment.

FIG. 6 is a flowchart of a light field image capture method according to an embodiment.

At step 610, some of the multiple lenses of the micro-lens array 520 may be selected as activated lenses. The remaining lenses, determined by excluding the activated lenses from the multiple lenses of the micro-lens array 520, may be selected as deactivated lenses.

At step 620, the activated lenses, selected from among the multiple lenses of the micro-lens array 520, may provide light to the multiple elements of the image sensor 540.

Also, the deactivated lenses, determined by excluding the activated lenses from the multiple lenses of the micro-lens array 520, may not provide light to the image sensor 540.

At step 630, the image sensor 540 may generate image data according to the light provided to the multiple elements.

When light is provided to an element of the image sensor 540, the element may generate data corresponding to the provided light.

At step 640, the controller 535 may determine to finish capturing the light field image. When the controller 535 determines not to finish capturing the light field image, step 610 may be performed again. When the controller 535 determines to finish capturing the light field image, the process may be terminated.

When step 610 is performed again, a lens that differs from the currently activated lens may be selected as an activated lens.

For example, given n time slots, steps 610, 620, and 630 may be repeated n times. For the multiple lenses $L_0$ to $L_k$ of the micro-lens array 520, when the value of j % n is p, the lens $L_j$ may be included in the group p. The group p may be a group of lenses that are activated in the (p+1)-th time slot, among n time slots. Here, k may be an integer that is equal to or greater than 1, j may be an integer that is equal to or greater than 0 and equal to or less than k, and p may be an integer that is equal to or greater than 0 and equal to or less than n−1.

When step 610 is performed for the first time, $L_0, L_n, L_{2n}, L_{3n}$, and the like, selected from among the multiple lenses of the micro-lens array 520, may be activated. When step 610 is performed for the second time, $L_1, L_{n+1}, L_{2n+1}, L_{3n+1}$, and the like, selected from among the multiple lenses of the micro-lens array 520, may be activated. When step 610 is performed for the (n−1)-th time, $L_{n-1}, L_{2n-1}, L_{3n-1}, L_{4n-1}$, and the like, selected from among the multiple lenses of the micro-lens array 520, may be activated.

The method according to an embodiment may be implemented as a program that can be executed by various computer means. In this case, the program may be recorded on a computer-readable storage medium. The computer-readable storage medium may include program instructions, data files, and data structures, solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as, a floptical disk, ROM, random access memory (RAM), and flash memory. Examples of the program instructions include machine code, such as code created by a compiler, and high-level language code executable by a computer using an interpreter. The hardware devices may be configured to operate as one or more software modules, in order to perform the operation of the present invention, and the vice versa.

An apparatus and method that provide increased angular resolution or spatial resolution without an increase in the resolution of an image sensor are provided.

An apparatus and method that generate image data using some of multiple mirrors or some of multiple lenses in a single time slot based on timesharing are provided.

An apparatus and method in which a single mirror or a single lens provides light to multiple elements of an image sensor in a single time slot are provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, even if the described techniques are performed in a different order, the described components, such as systems, architectures, devices, or circuits, are combined or coupled with other components by a method different from the described methods, or the described components are replaced with other components or equivalents, the results are still to be understood as falling within the scope of the present invention.

Therefore, other implementations, embodiments, and modifications equivalent to the claims are included in the scope of the claims set forth below.

What is claimed is:

1. An apparatus for capturing a light field image, the apparatus comprising:
   a mirror array; and
   an image sensor,
   wherein a certain number of mirrors of multiple mirrors of the mirror array provide light to multiple elements of the image sensor,
   wherein each of the multiple mirrors is selected as one of the certain number of the mirrors in at least one of multiple time slots based on timesharing, and
   wherein the apparatus generates image data having a size that is larger than a resolution of the image sensor, by selecting a part of the multiple mirrors as the certain number of the mirrors based on timesharing and by enabling the selected mirrors to provide light to the multiple elements of the image sensor.

2. The apparatus of claim 1, wherein remaining mirrors, determined by excluding the certain number of the mirrors from the multiple mirrors, do not provide light to the image sensor.

3. The apparatus of claim 2, wherein, for two adjacent mirrors among the multiple mirrors, if one of the two mirrors provides light to the multiple elements of the image sensor as one of the certain number of the mirrors, a remaining one of the two mirrors does not provide light to the image sensor as one of the remaining mirrors.

4. The apparatus of claim 2, wherein:
   a rotation angle of each of the multiple mirrors changes; and
   each of the multiple mirrors operates as one of the certain number of the mirrors or as one of the remaining mirrors, according to the rotation angle.

5. The apparatus of claim 4, further comprising a controller for controlling the rotation angle.

6. The apparatus of claim 1, wherein:
   the apparatus generates the image data through n time slots obtained from timesharing; and
   each of the multiple mirrors provides light to the multiple elements of the image sensor in at least one of the n time slots, where n is an integer that is equal to or greater than 2.

7. The apparatus of claim 1, further comprising a main lens,
   wherein the certain number of the mirrors provide light to the multiple elements of the image sensor by reflecting light that has passed through the main lens.

8. A method for capturing a light field image, the method comprising:
   providing, by a certain number of mirrors of multiple mirrors of a mirror array, light to multiple elements of an image sensor; and
   generating, by the image sensor, image data, according to the light provided to the multiple element,
   wherein each of the multiple mirrors is selected as one of the certain number of the mirrors in at least one of multiple time slots based on timesharing, and
   wherein the apparatus generates image data having a size that is larger than a resolution of the image sensor, by selecting a part of the multiple mirrors as the certain number of the mirrors based on timesharing and by enabling the selected mirrors to provide light to the multiple elements of the image sensor.

9. An apparatus for capturing a light field image, the apparatus comprising:
   a micro-lens array; and
   an image sensor,
   wherein a certain number of lenses of multiple lenses of the micro-Lens array provide light to multiple elements of the image sensor,
   wherein each of the multiple lenses is selected as one of the certain number of the lenses in at least one of multiple time slots based on timesharing, and
   wherein the apparatus generates image data having a size that is larger than a resolution of the image sensor, by selecting a part of the multiple lenses as the certain number of the lenses and by enabling the selected lenses to provide light to the multiple elements of the image sensor.

10. The apparatus of claim 9, wherein remaining lenses, determined by excluding the certain number of the lenses from the multiple lenses, do not provide light to the image sensor.

11. The, apparatus of claim 10, wherein, for two adjacent lenses among the multiple lenses, if one of the two lenses provides light to the multiple elements of the image sensor as one of the certain number of the lenses, a remaining one of the two lenses does not provide light to the image sensor, as one of the remaining lenses.

12. The apparatus of claim 10, further comprising a mask that includes multiple areas and controls whether each of the multiple areas passes light,
   wherein each of the multiple lenses operates as one of the certain number of the lenses or as one of the remaining lenses due to the mask.

13. The apparatus of claim 12, wherein, for the multiple lenses, a lens adjacent to an area that passes light among the multiple areas operates as one of the certain number of the lenses, and a lens adjacent to an area that does not pass light among the multiple areas operates as one of the remaining lenses.

14. The apparatus of claim 13, further comprising a controller for electronically controlling the mask.

15. The apparatus of claim 9, wherein:
   the apparatus generates the image data through n time slots obtained from timesharing; and
   each of the multiple lenses provides light to the multiple elements of the image sensor in at least one of n time slots, where n is an integer that is equal to or greater than 2.

16. The apparatus of claim 9, further comprising a main lens,
   wherein the certain number of the lenses provide light to the multiple elements of the image sensor by focusing light that has passed through the main lens on each of the multiple elements.

* * * * *